United States Patent Office 3,268,598
Patented August 23, 1966

1

3,268,598
NOVEL COMPOUND (1,6-DIHYDROXY-2,3,4,5-TETRAIODO-2,4-HEXADIENE)
Hyman Iserson, Philadelphia, Pa., assignor to Pennsalt Chemicals Corporation, Philadelphia, Pa., a corporation of Philadelphia
No Drawing. Filed Aug. 21, 1963, Ser. No. 303,684
1 Claim. (Cl. 260—633)

This invention deals with a new composition of matter, 1,6-dihydroxy-2,3,4,5-tetraiodo-2,4-hexadiene, which compound has the structure

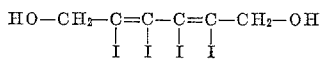

The novel compound of this invention is of particular value as a defoliant, and when sprayed on the foliage of plants, causes the leaves to drop without significant desiccant effects.

The compound of the invention is prepared by the addition of iodine (dissolved in KI solution) to 2,4-hexadiyne-1,6-diol. The reaction occurs at elevated temperatures of the order of 75–100° C. The reaction mass thus obtained contains the product which may be separated by the usual techniques of organic chemistry. The following examples will serve to further describe and characterize the invention.

Example 1

2,4-hexadiyne-1,6-diol (22 g.) was added to 137.6 g. of potassium iodide and 104.2 g. of iodine in 1500 ml. of water. The mixture was heated with stirring for 7 hours at 93–95° C. and the reaction mass was then cooled and the liquid decanted from the product residue. The residue was dissolved in acetone and diluted with water. The oil which separated was taken up in ether and the solution dried over anhydrous calcium sulfate. Addition of carbon tetrachloride precipitated the crude product which melted at 92–95° C. The crude product was washed with 5% sodium bisulfite and then with water, and the solid recrystallized from xylene to obtain product melting at 95–95.5° C. The chemical analysis was as follows, which confirmed that the product was 1,6-dihydroxy-2,3,4,5-tetraiodo-2,4-hexadiene:

Found: C, 11.84%; H, 1.11%; I, 82.7%. Calculated for $C_6H_6I_4O_2$: C, 11.65%; H, 0.97%; I, 83.6%.

The product is a crystalline, pale yellow solid which is soluble in acetone, diacetone, alcohol and xylene and slightly soluble in water.

Example 2

1,6-dihydroxy-2,3,4,5-tetraiodo-2,4-hexadiene was formulated as a defoliant spray as follows:

A solution of the active agent in acetone containing an alkyl aryl polyether glycol surfactant (Triton X-155) was prepared so that the formulation contained 10% by weight active agent, 85% acetone, and 5% surfactant. This formulation concentrate was then dispersed in water to obtain a sprayable dispersion. One-week-old black valentine bean plants were sprayed with this formulation at rates of 1 and 10 pounds per acre and the plants observed over a three-week period. After 14 days, the plants sprayed at the 10 pound per acre rate were completely defoliated, and after 21 days' observation, the plants treated at the rate of 1 pound per acre were defoliated to the extent of 37.5%. In both cases, desiccation effects were nil, nor were the plants killed, nor any chlorosis evident.

It will be understood that numerous changes and variations may be made from the above description and examples without departing from the spirit and scope of the invention.

I claim:
1,6-dihydroxy-2,3,4,5-tetraiodo-2,4-hexadiene.

No references cited.

L. ZITVER, Primary Examiner.
J. E. EVANS, Assistant Examiner.